(12) United States Patent
Abusharkh

(10) Patent No.: US 9,206,060 B1
(45) Date of Patent: Dec. 8, 2015

(54) METHOD FOR PURIFYING LIQUIDS

(71) Applicant: Basel Abusharkh, Al-Khobar (SA)

(72) Inventor: Basel Abusharkh, Al-Khobar (SA)

( * ) Notice: Subject to any disclaimer, the term of this patent is extended or adjusted under 35 U.S.C. 154(b) by 0 days.

(21) Appl. No.: 14/748,654

(22) Filed: Jun. 24, 2015

Related U.S. Application Data

(63) Continuation of application No. 14/720,666, filed on May 22, 2015.

(51) Int. Cl.
*C02F 1/44* (2006.01)
*B01D 61/10* (2006.01)
*C02F 1/469* (2006.01)
*C02F 101/10* (2006.01)
*C02F 103/08* (2006.01)

(52) U.S. Cl.
CPC ............... *C02F 1/441* (2013.01); *B01D 61/10* (2013.01); *C02F 1/4693* (2013.01); *C02F 2101/10* (2013.01); *C02F 2103/08* (2013.01); *C02F 2201/46* (2013.01)

(58) Field of Classification Search
None
See application file for complete search history.

(56) References Cited

U.S. PATENT DOCUMENTS

| | | | |
|---|---|---|---|
| 4,312,755 A * | 1/1982 | Hwang | 210/321.87 |
| 5,091,093 A | 2/1992 | Herwig et al. | |
| 5,501,798 A * | 3/1996 | Al-Samadi et al. | 210/652 |
| 5,635,071 A * | 6/1997 | Al-Samadi | 210/652 |
| 6,113,797 A | 9/2000 | Al-Samadi | |
| 6,929,748 B2 | 8/2005 | Avijit et al. | |
| 7,097,769 B2 * | 8/2006 | Liberman et al. | 210/652 |
| 7,811,457 B2 | 10/2010 | Marston | |
| 2006/0011544 A1 | 1/2006 | Sharma et al. | |
| 2010/0032377 A1 * | 2/2010 | Wohlert | 210/652 |
| 2012/0160753 A1 | 6/2012 | Vora et al. | |
| 2014/0021135 A1 | 1/2014 | Sawyer et al. | |
| 2014/0045248 A1 | 2/2014 | Wallace | |
| 2014/0061129 A1 | 3/2014 | Hoz | |
| 2014/0224716 A1 | 8/2014 | Hancock et al. | |
| 2014/0299529 A1 | 10/2014 | Govind et al. | |
| 2015/0014248 A1 | 1/2015 | Herron et al. | |

FOREIGN PATENT DOCUMENTS

EP    1020407    7/2000

* cited by examiner

*Primary Examiner* — Krishnan S Menon
(74) *Attorney, Agent, or Firm* — Richard C Litman

(57) ABSTRACT

The method for purifying liquids purifies a saline liquid, e.g., salt water, using a plurality of first phase reverse osmosis (RO) units and at least one final phase reverse osmosis unit. The plurality of first phase reverse osmosis units are arranged in series. At least some of the concentrate in a last reverse osmosis unit of the series is recycled back to the permeate or output side of that unit to provide a mixed permeate. The mixed permeate is then passed successively to the permeate side of each preceding reverse osmosis unit in the series. This increases the salt content of the liquid in the permeate side of each phase, thus reducing the concentration differential across reverse osmosis membranes of the first phase reverse osmosis units.

14 Claims, 5 Drawing Sheets

METHOD FOR PURIFYING LIQUIDS

CROSS-REFERENCE TO RELATED APPLICATIONS

This is a continuation of my prior application Ser. No. 14/720,666, filed May 22, 2015, now pending.

BACKGROUND OF THE INVENTION

1. Field of the Invention

The present invention relates generally to liquid processing systems and methods, and particularly to a method for purifying liquids using a series of reverse osmosis units in which a pressure differential across the membranes of the reverse osmosis units is reduced.

2. Description of the Related Art

Increasing population pressures, expanding industrialization, and various other factors have resulted in increasing demands upon the supply of fresh water in many parts of the world. A number of technologies for purifying water have been developed in response to this need. These technologies primarily remove salt and other impurities from seawater to produce fresh water.

One of the most common technologies used in water (and other liquid) purification is that of reverse osmosis (RO), where a solvent is forced through a permeable membrane from a region of high solute concentration to a region of low solute concentration by applying a pressure greater than osmotic pressure. However, reverse osmosis (RO) technology suffers from certain challenges that include low recovery ratio and membrane scaling. These two challenges control the economics of RO desalination and both of them are related to pressure across the membrane. Higher recoveries can be obtained by increasing the pressure across the membrane. However, such increase in pressure causes (1) higher scale formation that is promoted by compaction and (2) higher salt concentration in the concentrate side of the membrane. In addition, increased pressure across the membranes requires costly membrane assemblies and higher power consumption.

A number of liquid purification systems have been developed in the past. An example of such is found in European Patent Publication No. 1,020,407 published on Jul. 19, 2000 to Uwatech GMBH et al. This reference describes (according to the drawings and English abstract) treating condensate effluent containing ammonium nitrate by successive reverse osmosis to yield a process water stream and a concentrate which is recycled.

Thus, a method for purifying liquids solving the aforementioned problems is desired.

SUMMARY OF THE INVENTION

The method for purifying liquids includes a first phase liquid purification and a final phase liquid purification. The first phase liquid purification includes providing a saline liquid to a plurality of first phase reverse osmosis units. The final phase liquid purification includes providing the processed liquid from the first phase liquid purification to a final phase reverse osmosis unit for desalination by reverse osmosis.

The first phase reverse osmosis units are arranged in series with one another from a first reverse osmosis unit to a last reverse osmosis unit. Each of the first phase reverse osmosis units have a concentrate side, a permeate side, and a reverse osmosis membrane separating the concentrate side from the permeate side. The first phase reverse osmosis units maintain a small differential of concentration of ions across the membrane by using low rejection membranes and/or passing brine from the concentrate side to the permeate side to form a mixed permeate. This small differential in ion concentration reduces the pressure gradient across the membrane. The mixed permeate from the first reverse osmosis unit is fed to the final phase reverse osmosis unit. The final phase reverse osmosis unit includes a high rejection membrane and produces pure desalinated water.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method for purifying liquids includes several embodiments, each incorporating a plurality of reverse osmosis (RO) units for purifying a saline liquid. As used herein, "saline liquid" refers to a liquid that contains a significant concentration of dissolved salts (mainly NaCl). The method for purifying liquids can be used to purify a saline liquid, such as, sea water, brackish water, industrial waste water, municipal waste water, leachate water, frac water, oil field production water, or any other type of water needing desalination. Each embodiment includes a plurality of first phase reverse osmosis units for performing a first phase liquid purification and a final phase reverse osmosis unit for performing a final phase liquid purification. The first phase reverse osmosis units provide a plurality of reverse osmosis stages within the first phase liquid purification. The first phase reverse osmosis units are arranged in series with one another from a first reverse osmosis unit to a last reverse osmosis unit. Each of the first phase reverse osmosis units have a concentrate side, a permeate side, and a reverse osmosis membrane separating the concentrate side from the permeate side. The first phase reverse osmosis units maintain a small differential of concentration of ions across the membrane by using low rejection membranes and/or passing brine from the concentrate side to the permeate side to form a mixed permeate. This small differential in ion concentration reduces the pressure gradient across the membrane. The mixed permeate from the first reverse osmosis unit is fed to the final phase reverse osmosis unit. The final phase reverse osmosis unit includes a high rejection membrane for producing pure desalinated water.

Figure 1:
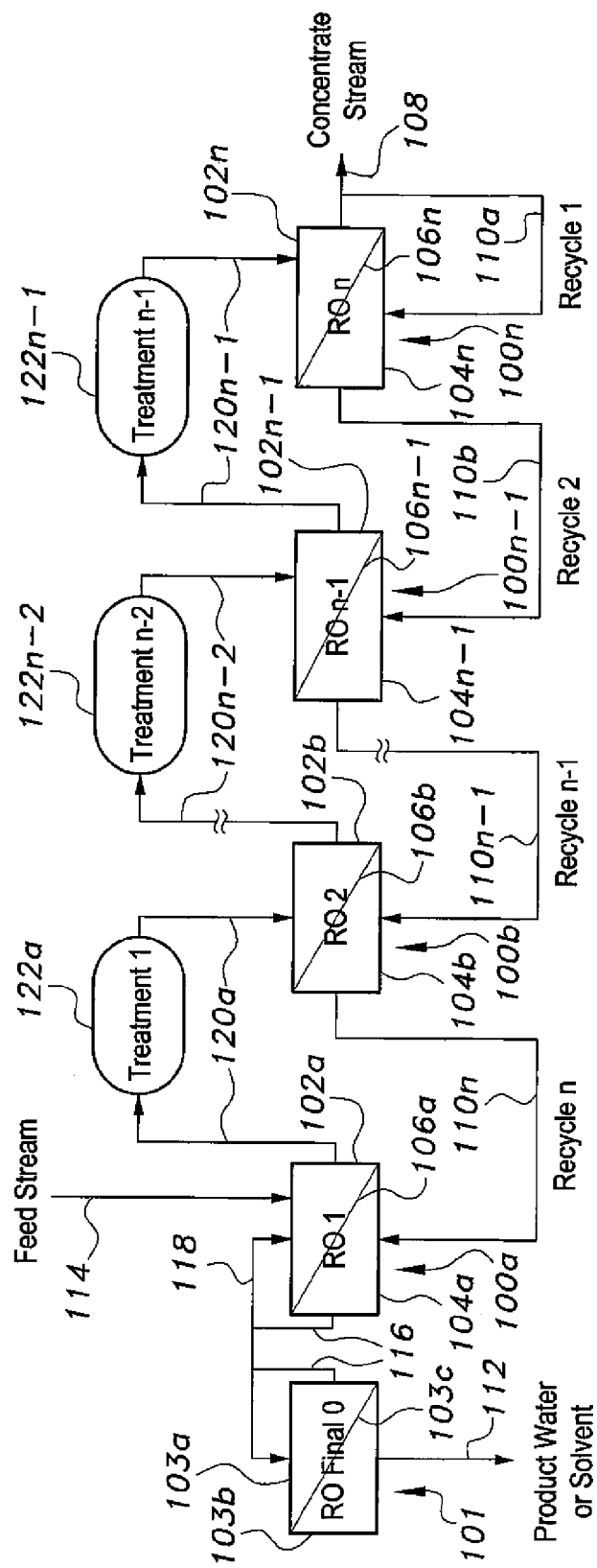
FIG. 1 is a schematic illustration of a first embodiment of a system and method for purifying liquids according to the present invention.

FIG. 1 of the drawings is a schematic illustration of a first embodiment of the method for purifying liquids. The first embodiment method includes performing a first phase liquid purification and a final phase liquid purification. The first phase liquid purification is performed using a series of first phase reverse osmosis (RO) units designated as first reverse osmosis unit 100a, second reverse osmosis unit 100b, and a last reverse osmosis unit 100n. It will be seen that any practicable number of reverse osmosis units may be provided, as desired. The final phase liquid purification is performed using at least one final phase reverse osmosis unit 101. Each first phase reverse osmosis unit 100a, 100b, ... 100n includes a concentrate side, respectively 102a through 102n, a permeate side, respectively 104a through 104n, and an RO membrane, respectively 106a through 106n, separating the concentrate and permeate sides of each reverse osmosis unit. The final phase reverse osmosis unit 101 includes a concentrate side 103a, a permeate side 103b, and an RO membrane 103c. The concentrate side 102a-102n of each of the first phase reverse osmosis units 100a-100n is in communicating relation with the concentrate side of the next reverse osmosis unit in succession. The permeate side 104a-104n of each of the first phase reverse osmosis units 100a-100n communicates with the permeate side of the preceding reverse osmosis unit in succession. The concentrate side 103a of the final phase reverse osmosis unit 101 is in communicating relation with the permeate side 104a of the first reverse osmosis unit 100a in the series of first phase reverse osmosis units.

The first phase liquid purification includes successively receiving a feed stream of saline liquid in the concentrate side 102a-102n of the first phase reverse osmosis units 100a-100n. In each of the first phase reverse osmosis units 100a-100n, water is forced from the concentrate side into the permeate side by reverse osmosis. At least a portion of concentrate from the concentrate side 102n of the last reverse osmosis unit 100n is transferred into the permeate side 104n of the last reverse osmosis unit 100n to form a mixed permeate. The mixed permeate from the last reverse osmosis unit 100n is fed to the permeate side 104n-1 of the reverse osmosis unit 100n-1 immediately preceding the last reverse osmosis unit, and the mixed permeate from that reverse osmosis unit 100n-1 is passed to the preceding reverse osmosis unit 100b, and so forth until a mixed permeate is formed in each of the first phase reverse osmosis units. As the permeate in each first phase reverse osmosis unit is concentrated by the recycled concentrate from the next reverse osmosis unit, there is a smaller concentration differential between the permeate and the concentrate in each of the first phase reverse osmosis units. This allows the pressure differential, and thus the power required, to be reduced across each first phase reverse osmosis unit.

The final phase liquid purification includes receiving from the first reverse osmosis unit 100a a feed stream of mixed permeate into the concentrate side 103a of the final phase reverse osmosis unit 101. As described above, the final phase reverse osmosis unit 101 includes a high rejection RO membrane 103c. Pure water is forced from the concentrate side 103a into the permeate side 103b of the final phase reverse osmosis unit 101, and released from the permeate side 103b to provide purified liquid. The concentrate from the final phase reverse osmosis unit 101 can be fed back to the concentrate side 102a of the first reverse osmosis unit 100a via line 118.

In more detail, the first reverse osmosis unit 100a receives a saline liquid, e.g., salt water, via a feed stream 114. Water is forced through the RO membrane 106a of the first reverse osmosis unit 100a to the permeate side, with the remaining concentrate passing to the concentrate side 102b of the next reverse osmosis unit 100b in series via a concentrate line 120a. Concentrate liquid from that reverse osmosis unit is passed to the next reverse osmosis unit in succession via a similar concentrate line. Concentrate sides 102a, 102b, ... 102n of all of the reverse osmosis units 100a, 100b, ... 100n are connected in series with one another by respective concentrate lines 120a, 120b, ... 120n-1. A liquid treatment device can be installed in series in each of the concentrate lines, with all of the concentrate liquid passing through each of the devices in succession. Thus, a first liquid treatment device 122a can be installed in the concentrate line 120a between the concentrate sides 102a and 102b of the first and second reverse osmosis units 100a and 100b, etc., with a penultimate liquid treatment device 122n-2 being installed in the concentrate line 120n-2 between the concentrate side of the preceding reverse osmosis unit and the concentrate side 102n-1 of the reverse osmosis unit 100n-1, and a last liquid treatment device 122n-1 installed in the concentrate line 120n-1 between the concentrate side 102n-1 of the penultimate reverse osmosis unit 100n-1 and the concentrate side 102n of the last reverse osmosis unit 100n. These liquid treatment devices 122a ... 122n-1 provide further purification of the water or other liquid passing through the system by removing scale forming salts, ions, and/or other materials. The liquid treatment device can be a filtration device, a chemical seeding device, a chemical injection device, and/or a nanofiltration device, which may be followed by further filtration and/or ion exchange.

The concentrate is recycled from the output or concentrate stream 108 from the concentrate side 102n of the last reverse osmosis unit 100n, back to the permeate side 104n of that reverse osmosis unit by a first recycle line 110a to form a mixed permeate, thus increasing the concentrate level in the permeate side 104n of that reverse osmosis unit. The permeate side 104n of the last reverse osmosis unit 100n is connected to the permeate side 104n-1 of the immediately preceding reverse osmosis unit 100n-1 by a second recycle line 110b. The mixed permeate is passed to the permeate side 104n-1 of the preceding reverse osmosis unit 100n-1 from the permeate side 104n of the last reverse osmosis unit 100n in the reverse osmosis unit series. This recycling process continues, with a recycling line 110n-1 delivering mixed permeate to the permeate side 104b of the second reverse osmosis unit 100b and mixed permeate from the second reverse osmosis unit 100b passes to the permeate side 104a of the first reverse osmosis unit 100a. The mixed permeate from the first reverse osmosis unit is fed to the final phase reverse osmosis unit 101. Purified liquid in the permeate side 103b of the final phase reverse osmosis unit 101 is expelled therefrom by a product water or solvent line 112.

The process of recycling permeate from each successive reverse osmosis unit to the preceding reverse osmosis unit has the effect of increasing the concentrate level in the permeate side of each reverse osmosis unit, thus reducing the concentration differential across the RO membrane. Thus, less pressure, and less power, is required to force the concentrate through the RO membrane of each reverse osmosis unit. Further, the RO membranes of the first phase reverse osmosis units may be low rejection membranes or leaky membranes which will allow salt ions to leak through the membrane to reduce the concentration differential across the membrane. In other words, the RO membranes of the first phase reverse osmosis units may be somewhat more porous, i.e., more permeable, than would otherwise be required. The greater porosity and permeability also results in reduced cost.

Figure 2:
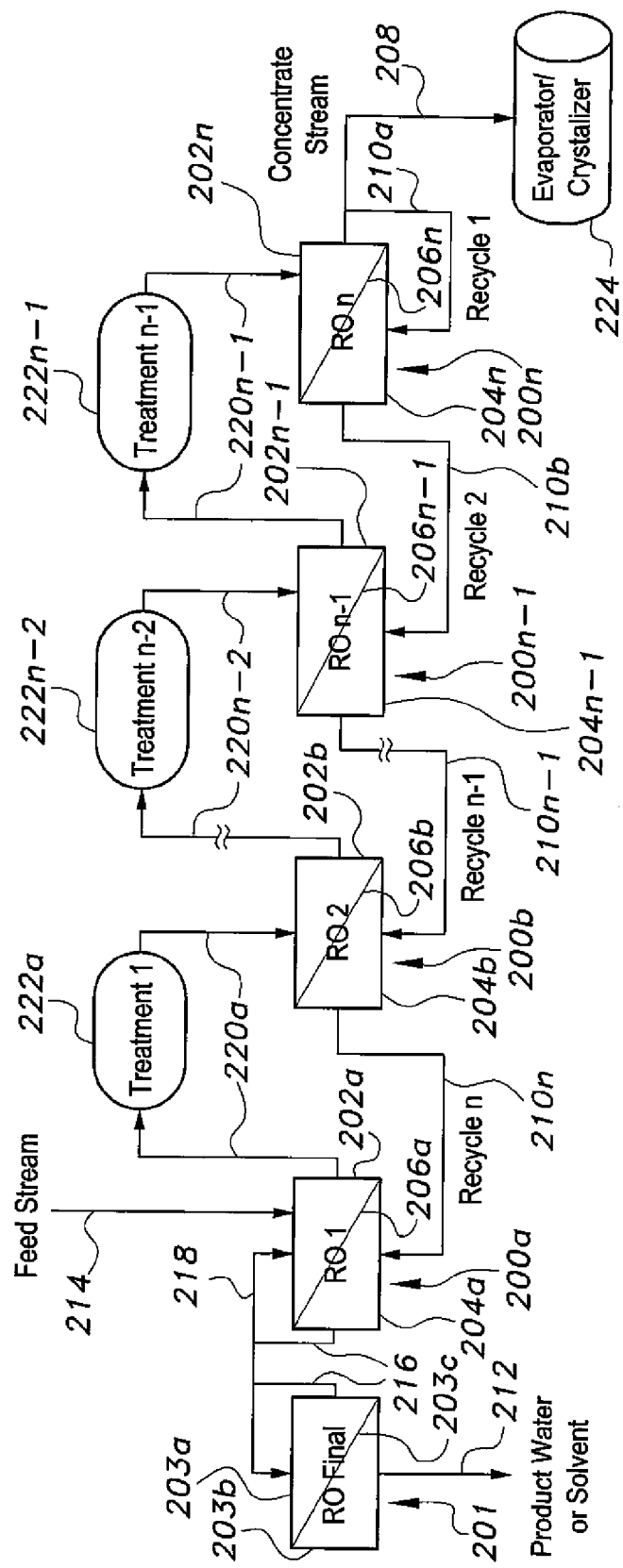
FIG. 2 is a schematic illustration of a second embodiment of a system and method for purifying liquids according to the present invention, incorporating an evaporator and/or crystallizer.

FIG. 2 of the drawings provides a schematic illustration of a second embodiment of the method for purifying liquids. It will be seen that the components of the second embodiment of FIG. 2 are essentially identical to corresponding components of the first embodiment of FIG. 1, but the components of the FIG. 2 embodiment are designated by reference characters beginning with the number "2," rather than with a "1" as in the case of the embodiment of FIG. 1. The method of operation of the system illustrated in FIG. 2 is the same as described above for the operating method of the first embodiment of FIG. 1, with the exception of an additional evaporator and/or crystallizer device 224 installed at the output or discharge end of the concentrate or output stream or line 108. Any remaining solvent, e.g., water, etc., passes from the concentrate side 102$n$ of the last reverse osmosis unit 100$n$ through the concentrate output line 108 and is processed through this device 224, and solids are recovered (e.g., precipitated out of solution, recovered after liquid evaporation, etc.) for use or disposal as desired.

Figure 3:
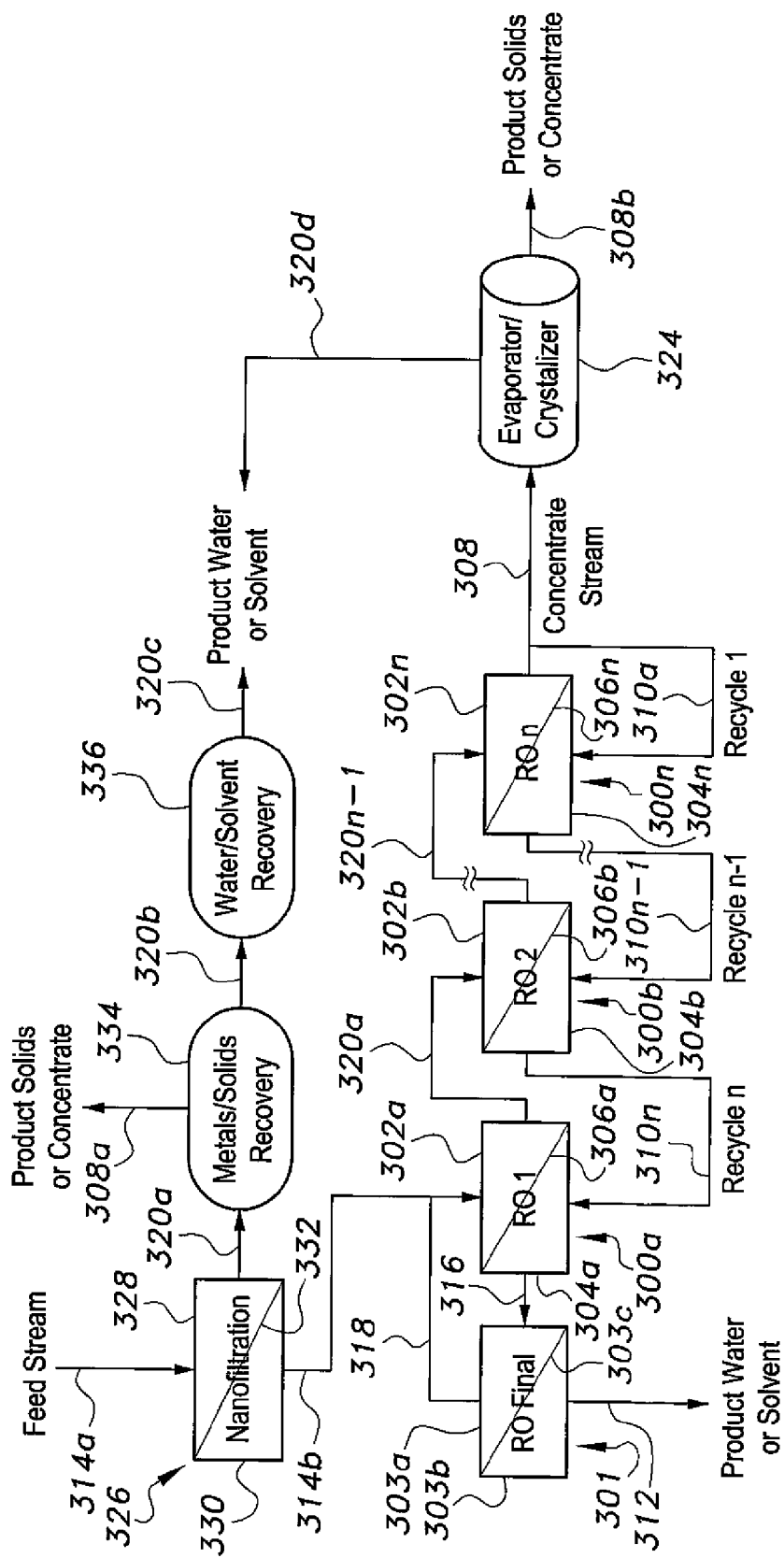
FIG. 3 is a schematic illustration of a third embodiment system of a system and method for purifying liquids according to the present invention, incorporating a nanofiltration device in the incoming liquid feed stream.

FIG. 3 of the drawings provides a schematic illustration of a third embodiment of the method for purifying liquids. It will be seen that most of the components of the third embodiment of FIG. 3 are essentially identical to corresponding components of the first and second embodiments of FIGS. 1 and 2, but the components of the FIG. 3 embodiment are designated by reference characters beginning with the number "3," rather than with a "1" or a "2" as in the case of the embodiments of FIGS. 1 and 2. The method of operation of the system illustrated in FIG. 3 is generally the same as described above for the operating method of the embodiment of FIG. 2, with the exception of a parallel system between the feed stream 314 and the evaporator and/or crystallizer 324. In the system of FIG. 3, a nanofiltration device 326 is installed in series in the feed stream line upstream of the first reverse osmosis unit 304$a$. The nanofiltration device 326 includes a concentrate side 328 fed by the incoming feed stream line 314$a$, a permeate side 330 delivering permeate to an outgoing feed stream line 314$b$ and thence to the concentrate side 302$a$ of the first RO reverse osmosis unit 300$a$, and a reverse osmosis unit element 332 (e.g., nanoreverse osmosis unit, etc.) between the two sides 328 and 330. A connecting line 318 extends between the outgoing feed stream line 314$b$ and the concentrate side 303$a$ of the final phase reverse osmosis unit 301, to deliver treated liquid to the final phase reverse osmosis unit 301. The final phase reverse osmosis unit 301 also receives mixed permeate from the permeate side 304$a$ of the first reverse osmosis unit 300$a$ in the manner described above for the first embodiment of FIG. 1, also used in the second embodiment of FIG. 2.

The third embodiment of FIG. 3 further includes a metals and solids recovery device 334 that receives and processes concentrate from the concentrate side 328 of the nanofiltration device 326 via an interconnecting line 320$a$, with a water and/or solvent recovery device 336 receiving and processing liquid output from the metals and solids recovery device 334 via an interconnecting line 320$b$. Processed water or solvent is delivered from the system by a line 320$c$ from the water and/or solvent recovery device 336, and by a line 320$d$ from the evaporator/crystallizer device 324. Processed solids and/or concentrate are removed from the system by output 308$a$ from the metals and solids recovery device 334, and by output 308$b$ from the evaporator/crystallizer device 324. The two outputs 308$a$, 308$b$ may extend to a single output destination, similarly to the two lines 320$c$ and 320$d$ that extend to a single product water or solvent collection point.

Figure 4:
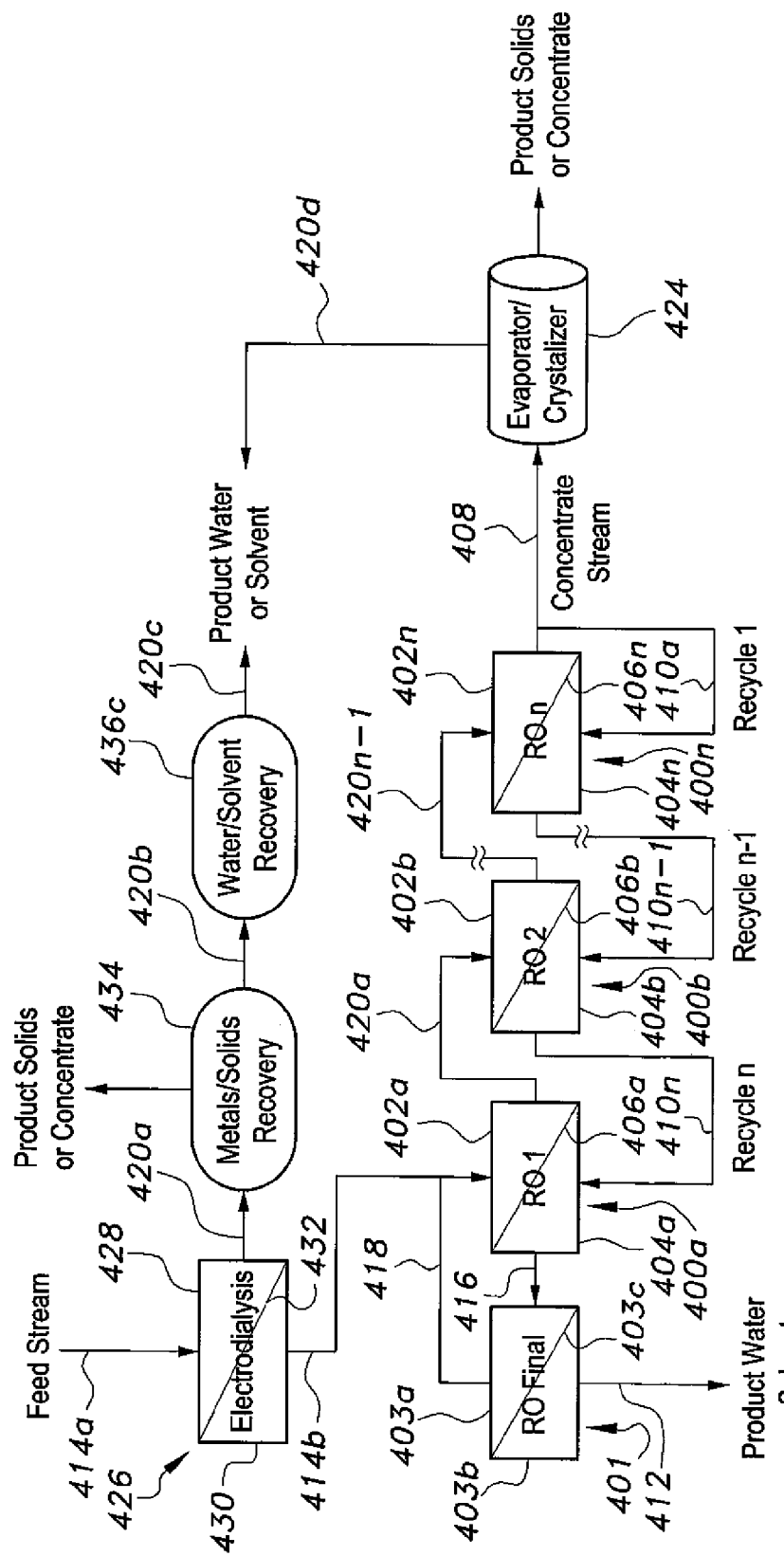
FIG. 4 is a schematic illustration of a fourth embodiment of a system and method for purifying liquids according to the present invention, incorporating an electrodialysis device in the incoming liquid feed stream.

FIG. 4 of the drawings provides a schematic illustration of a fourth embodiment of the method for purifying liquids. It will be seen that most of the components of the fourth embodiment of FIG. 4 are essentially identical to corresponding components of the third embodiment of FIG. 3, but the components of the FIG. 4 embodiment are designated by reference characters beginning with the number "4," rather than with a "3" as in the case of the embodiment of FIG. 3. The method of operation of the system illustrated in FIG. 4 is generally the same as described above for the operating method of the embodiment of FIG. 3, with the exception of the installation of an electrodialysis device 426 in place of the nanofiltration device 326 of the system of FIG. 3. The electrodialysis device 426 includes an input or concentrate side 428, an output or permeate side 430, and an electrodialysis unit or component 432 therebetween. Concentrate liquid is provided to the concentrate side 428 of the device and is processed therein by the electrodialysis unit 432, with the processed liquid passing from the output side 430 to the concentrate side 402$a$ of the phase 1 RO unit 400$a$ via the line 414$b$, and to the concentrate side 403$a$ of the final reverse osmosis unit 401 via the line 418. The concentrate side 428 of the electrodialysis device 426 also provides concentrate to the metals and/or solids recovery device 434 via a line 420$a$, with the remainder of the system of FIG. 4 operating identically to the system of FIG. 3.

Figure 5:
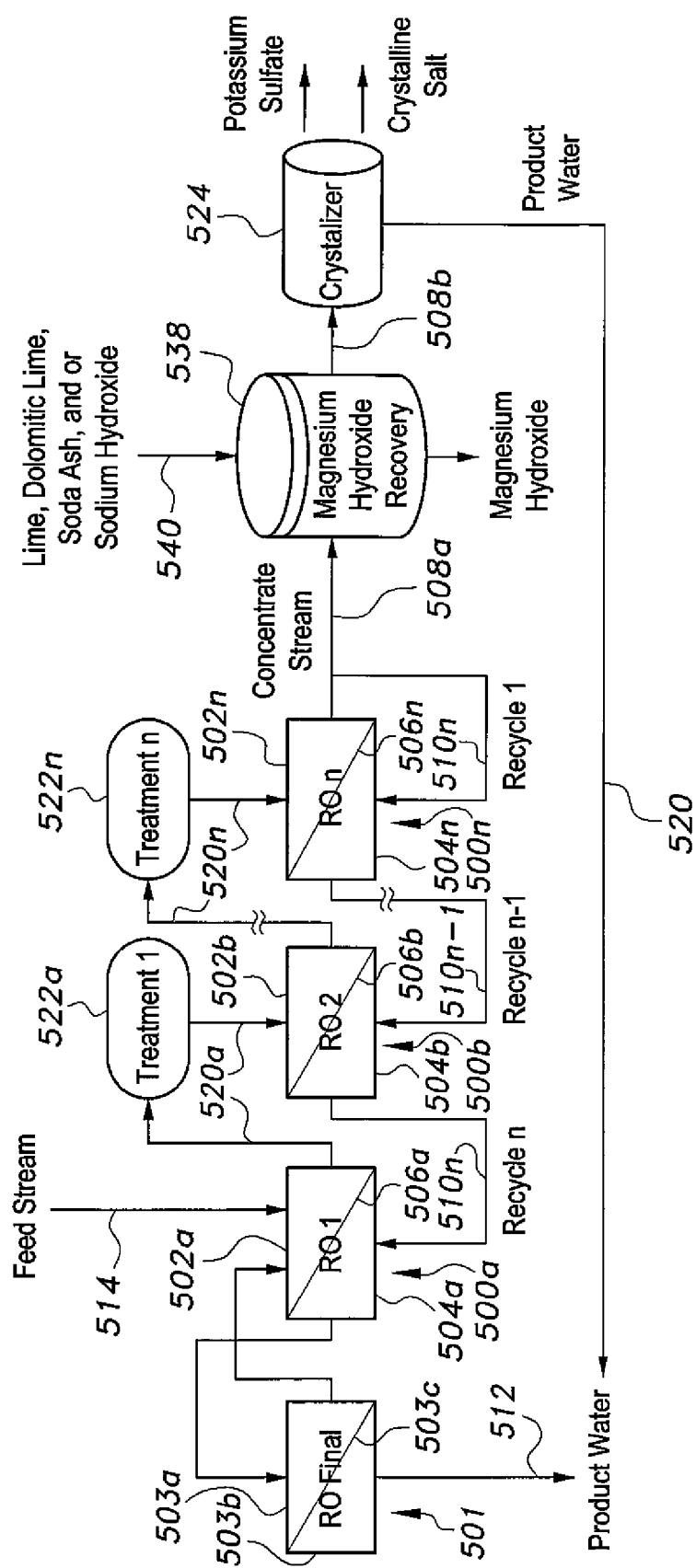
FIG. 5 is a schematic illustration of a fifth embodiment of a system and method for purifying liquids according to the present invention, incorporating a magnesium hydroxide recovery device in the output liquid feed stream.

FIG. 5 of the drawings provides a schematic illustration of a fifth embodiment of the method for purifying liquids. It will be seen that most of the components of the fifth embodiment of FIG. 5 are essentially identical to corresponding components of the second embodiment of FIG. 2, but the components of the FIG. 5 embodiment are designated by reference characters beginning with the number "5," rather than with a "2" as in the case of the embodiment of FIG. 2. The method of operation of the system illustrated in FIG. 5 is generally the same as described above for the operating method of the embodiment of FIG. 2, with the exception of a magnesium hydroxide (MgOH) recovery device 538 disposed between the concentrate side 502$n$ of the last RO unit 500$n$ and the crystallizer 524, which may be identical to the evaporator and/or crystallizer devices of the embodiments of FIGS. 2 through 4. A concentrate stream line 508$a$ extends from the concentrate side 502$n$ of the last phase RO unit 500$a$, to supply the MgOH recovery device 538. Output from the MgOH recovery device 538 is supplied to the evaporator and/or crystallizer (or crystallizer) 524 by a second concentrate line 508$b$. Additional concentrate in the form of lime and/or dolomitic lime, soda ash, and/or sodium hydroxide is fed to the MgOH recovery device by an additional feed line 540, with the MgOH recovery device processing the input material and delivering MgOH therefrom. Other concentrate is delivered to the crystallizer or evaporator and/or crystallizer 524 by a line or feed 508$b$ for processing. The evaporator and/or crystallizer 524 delivers a solids output of potassium sulfate and crystalline salt, with liquid in the form of product water being output by a line 520. Product water is also delivered from the permeate side 503$b$ of the final phase reverse osmosis unit 501 by a line 512. These two lines 512 and 520 may deliver their product water output to a common collection point, as indicated in FIG. 5.

The volume of product water produced by the present methods can be at least 70% of the volume of the feed water stream. For example, the volume of product water can be about 70% to about 95% of the volume of the feed water stream. As an example of the efficiency of the above-described embodiments, a desalination plant reject stream was processed through a reverse osmosis system including a first phase liquid purification having three reverse osmosis units and a final phase liquid purification having one reverse osmosis unit, according to the present teachings, with ion exchange after the second first phase reverse osmosis unit. Table 1 below shows the concentrations of the three concentrate streams as well as the concentrate of the permeate stream from the final phase liquid purification. A concentration of 26 percent can be achieved from the concentrate stream of the third RO unit.

TABLE 1

|  | PPM | MASS (KG) | RO 1 Concentrate | RO 2 Concentrate | RO 3 Concentrate | RO Final Permeate Final |
|---|---|---|---|---|---|---|
| Chloride (Cl) | 36159 | 3.6159 | 3.579741 | 3.50814618 | 3.473064718 | 0.015 |
| Sodium (Na) | 16800 | 1.68 | 1.6632 | 1.629936 | 1.61363664 | 0.0075 |
| Bromide (Br) | 1 | 0.0001 | 0.000099 | 0.00009702 | $9.60498 \times 10^{-5}$ | $3.9502 \times 10^{-6}$ |
| Sulfate (SO4) | 550 | 0.055 | 0.054945 | 0.0274725 | 0.01373625 | 0.004126375 |
| Potassium (K) | 556 | 0.0556 | 0.0555444 | 0.0277722 | 0.0138861 | 0.002085695 |
| Calcium (Ca) | 864 | 0.0864 | 0.0863136 | 0.0431568 | 0.0215784 | 0.00324108 |
| Magnesium (Mg) | 2448 | 0.2448 | 0.2445552 | 0.1222776 | 0.0611388 | 0.00918306 |
| Water | 0.942622 | 94.2622 | 47.1311 | 28.27866 | 19.795062 | 74.467138 |
| TDS | 57378 | 5.7378 | 5.6843982 | 5.3588583 | 5.197136958 | 0.04114016 |
| MASS FRACTION OF SALTS |  | 0.06087064 | 0.120608223 | 0.189501847 | 0.262547142 | 0.000552461 |

It will be noted that the concentrate stream from the third RO unit as described in Table 1 above can be further processed to recover magnesium hydroxide by adding dolomitic lime. Further, the concentrate stream from the third RO unit as described in Table 1 above can be fed to a three-phase crystallizer as shown in the schematic illustrations of FIGS. 2 through 5 in which gypsum, magnesium hydroxide, and crystalline salt of up to 99.8 percent purity may be obtained, and water is recovered.

It is to be understood that the present invention is not limited to the embodiments described above, but encompasses any and all embodiments within the scope of the following claims.

I claim:

1. A method for purifying liquids, comprising the following steps:
   (a) performing a first phase liquid purification including providing a plurality of first phase reverse osmosis units, the first phase reverse osmosis units arranged in series with one another from a first reverse osmosis unit to a last reverse osmosis unit, each of the first phase reverse osmosis units having a concentrate side, a permeate side, and a reverse osmosis membrane separating the concentrate side from the permeate side, the concentrate side of each of the first phase reverse osmosis units communicating with the concentrate side of the next reverse osmosis unit in succession, the permeate side of each of the first phase reverse osmosis units communicating with the permeate side of the preceding reverse osmosis unit in succession;
   (b) providing a nanofiltration OR electrodialysis device communicating with at least the concentrate side of the first reverse osmosis unit of the first phase reverse osmosis units;
   (c) providing a metals and solids recovery device communicating with the nanofiltration OR electrodialysis device;
   (d) providing a solvent recovery device communicating with the metals and solids recovery device; and
   (e) processing liquid through the nanofiltration OR electrodialysis device, the metals and solids recovery device, and the solvent recovery device, wherein the nanofiltration OR electrodialysis device, the metals and solids recovery device, and the solvent recovery device are disposed in series with one another;
   (f) performing a final phase liquid purification including providing at least one final phase reverse osmosis unit, the final phase reverse osmosis unit having a concentrate side, a permeate side, and a reverse osmosis membrane separating the concentrate side from the permeate side, the concentrate side of the final phase reverse osmosis unit communicating with the permeate side of the first reverse osmosis unit in the series of first phase reverse osmosis units;
   wherein the first phase liquid purification includes successively receiving a feed stream of saline liquid in the concentrate side of the first phase reverse osmosis units, forcing pure water from the concentrate side into the permeate side of the reverse osmosis units by reverse osmosis, transferring at least a portion of concentrate from the concentrate side of the last reverse osmosis unit into the permeate side of the last reverse osmosis unit to form a mixed permeate, and successively receiving a mixed permeate in the permeate side of the reverse osmosis units preceding the last reverse osmosis unit; and
   the final phase reverse osmosis includes receiving a feed stream of mixed permeate in the concentrate side of the final phase reverse osmosis unit, forcing pure water from the concentrate side of the final phase reverse osmosis unit into the permeate side of the final phase reverse osmosis unit, and releasing the pure water from the permeate side of the final phase reverse osmosis unit to provide purified liquid.

2. The method for purifying liquids according to claim 1, further including the steps of:
   providing a liquid treatment device between the concentrate sides of adjacent first phase reverse osmosis units; and
   supplying a feed stream of saline liquid to the liquid treatment device,
   wherein the liquid treatment device includes at least one treatment device selected from the group consisting of a filtration system, a chemical seeding system, a chemical injection system, and a nanofiltration OR electrodialysis system.

3. The method for purifying liquids according to claim 1, wherein the reverse osmosis membrane in each of the first phase reverse osmosis units is a low rejection membrane and the reverse osmosis membrane of the final phase reverse osmosis unit is a high rejection membrane.

4. The method for purifying liquids according to claim 1, further including the steps of:
- providing an evaporator and/or crystallizer device communicating with the concentrate side of the last reverse osmosis unit of the first phase reverse osmosis units; and
- passing at least a portion of concentrate from the concentrate side of the last reverse osmosis unit to the evaporator and/or crystallizer device.

5. The method for purifying liquids according to claim 1, further including the step of providing a magnesium hydroxide recovery device communicating with the concentrate side of the last reverse osmosis unit.

6. A method for purifying liquids, comprising the following steps:
- (a) performing a first phase liquid purification including providing a plurality of first phase reverse osmosis units, the first phase reverse osmosis units arranged in series with one another from a first reverse osmosis unit to a last reverse osmosis unit, each of the first phase reverse osmosis units having a concentrate side, a permeate side, and a reverse osmosis membrane separating the concentrate side from the permeate side, the concentrate side of each of the first phase reverse osmosis units communicating with the concentrate side of the next reverse osmosis unit in succession, the permeate side of each of the first phase reverse osmosis units communicating with the permeate side of the preceding reverse osmosis unit in succession;
- (b) providing a nanofiltration OR electrodialysis device communicating with at least the concentrate side of the first reverse osmosis unit of the first phase reverse osmosis units;
- (c) providing a metals and solids recovery device communicating with the nanofiltration OR electrodialysis device;
- (d) providing a solvent recovery device communicating with the metals and solids recovery device and
- (e) processing liquid through the nanofiltration OR electrodialysis device, the metals and solids recovery device, and the solvent recovery device
wherein the nanofiltration OR electrodialysis device, the metals and solids recovery device, and the solvent recovery device are disposed in series;
- (f) performing a final phase liquid purification including providing at least one final phase reverse osmosis unit, the final phase reverse osmosis unit having a concentrate side, a permeate side, and a reverse osmosis membrane separating the concentrate side from the permeate side, the concentrate side of the final phase reverse osmosis unit communicating with the permeate side of the first reverse osmosis unit of the first phase reverse osmosis units; and
- (g) further providing at least one liquid treatment device, the at least one liquid treatment device communicating with the concentrate side of adjacent first phase reverse osmosis units; wherein
the first phase liquid purification includes supplying a feed stream of saline liquid to one or more of the liquid treatment devices to form a treated feed stream, supplying the treated feed stream to the concentrate side of the respective first phase reverse osmosis units, forcing pure water from the concentrate side into the permeate side of the reverse osmosis units by reverse osmosis, transferring at least a portion of the concentrate in the concentrate side of the last reverse osmosis unit into the permeate side of the last reverse osmosis unit to form a mixed permeate, and successively receiving a mixed permeate in the permeate side of the reverse osmosis units preceding the last reverse osmosis unit; and the
final phase reverse osmosis includes receiving a feed stream of mixed permeate in the concentrate side of the final phase reverse osmosis unit, forcing pure water from the concentrate side into the permeate side of the final phase reverse osmosis unit, and releasing the pure water from the permeate side of the final phase reverse osmosis unit to provide purified liquid.

7. The method for purifying liquids according to claim 6, wherein the reverse osmosis membrane in each of the first phase reverse osmosis units is a low rejection membrane and the reverse osmosis membrane of the final phase reverse osmosis unit is a high rejection membrane.

8. The method for purifying liquids according to claim 6, further including the steps of:
- (a) providing an evaporator and/or crystallizer device communicating with the concentrate side of the last reverse osmosis unit of the first phase reverse osmosis units; and
- (b) passing at least a portion of concentrate from the concentrate side of the last reverse osmosis unit to the evaporator and/or crystallizer device.

9. The method for purifying liquids according to claim 6, further including the steps of:
- (a) providing an evaporator and/or crystallizer device communicating with the concentrate side of the last reverse osmosis unit of the first phase reverse osmosis units; and
- (b) passing at least a portion of concentrate from the concentrate side of the last reverse osmosis unit to the evaporator and/or crystallizer device.

10. The method for purifying liquids according to claim 6, further including the step of providing a magnesium hydroxide recovery device communicating with the concentrate side of the last reverse osmosis unit of the first phase reverse osmosis units.

11. A system for purifying liquids, comprising:
- (a) a plurality of first phase reverse osmosis units, the first phase reverse osmosis units arranged in series with one another from a first reverse osmosis unit to a last reverse osmosis unit, each of the first phase reverse osmosis units having a concentrate side, a permeate side, and a reverse osmosis membrane separating the concentrate side from the permeate side, the concentrate side of each of the first phase reverse osmosis units communicating with the concentrate side of the next reverse osmosis unit in succession, the permeate side of each of the first phase reverse osmosis units communicating with the permeate side of the preceding reverse osmosis unit in succession;
- (b) a nanofiltration OR electrodialysis device communicating with at least the concentrate side of the first reverse osmosis unit;
- (c) a metals and solids recovery device communicating with the nanofiltration OR electrodialysis device; and
- (d) a solvent recovery device communicating with the metals and solids recovery device,
wherein the nanofiltration OR electrodialysis device, the metals and solids recovery device, and the solvent recovery device are disposed in series;
- (e) at least one final phase reverse osmosis unit, the final phase reverse osmosis unit having a concentrate side, a permeate side, and a reverse osmosis membrane separating the concentrate side from the permeate side, the concentrate side of the final phase reverse osmosis unit communicating with the permeate side of the first reverse osmosis unit of the first phase reverse osmosis units.

12. The system for purifying liquids according to claim 11, wherein the reverse osmosis membrane in each of the first phase reverse osmosis units is a low rejection membrane and the reverse osmosis membrane of the final phase reverse osmosis unit is a high rejection membrane.

13. The system for purifying liquids according to claim 11, further comprising:
   an evaporator and/or crystallizer device communicating with the concentrate side of the last reverse osmosis unit of the first phase reverse osmosis units.

14. The system for purifying liquids according to claim 11, further comprising:
   an evaporator and/or crystallizer device communicating with the concentrate side of the last reverse osmosis unit of the first phase reverse osmosis units.

* * * * *